United States Patent
Lalam

(10) Patent No.: US 8,733,619 B2
(45) Date of Patent: May 27, 2014

(54) NICKEL-BASE RADIANT TUBE AND METHOD FOR MAKING THE SAME

(75) Inventor: Sree Harsha Lalam, Dyer, IN (US)

(73) Assignee: Arcelormittal Investigacion y Desarrollo, S.L., Sestao (ES)

(*) Notice: Subject to any disclaimer, the term of this patent is extended or adjusted under 35 U.S.C. 154(b) by 226 days.

(21) Appl. No.: 13/169,251

(22) Filed: Jun. 27, 2011

(65) Prior Publication Data

US 2011/0316271 A1 Dec. 29, 2011

Related U.S. Application Data

(60) Provisional application No. 61/358,639, filed on Jun. 25, 2010.

(51) Int. Cl.
*B23K 28/00* (2006.01)
*F16L 13/02* (2006.01)

(52) U.S. Cl.
USPC ........... 228/169; 228/165; 228/168; 228/196; 285/179; 285/181; 219/101

(58) Field of Classification Search
CPC .............................. B23K 31/027; B21C 37/08
USPC .......... 228/165, 168, 169, 196; 285/179, 181; 219/101
See application file for complete search history.

(56) References Cited

U.S. PATENT DOCUMENTS

| | | | |
|---|---|---|---|
| 1,491,176 A | 4/1924 | Smith | |
| 1,810,902 A | 6/1931 | Burnish | |
| 1,977,678 A | 10/1934 | Kidd | |
| 2,120,062 A | 6/1938 | Blevins | |
| 2,263,272 A | 11/1941 | Moss | |
| 2,271,652 A | 2/1942 | Langvand et al. | |
| 2,415,987 A * | 2/1947 | Bissout et al. | ................ 219/101 |
| 2,945,942 A | 7/1960 | Flynn et al. | |
| 3,080,179 A | 3/1963 | Huntsinger | |
| 3,268,248 A | 8/1966 | Chambers | |

(Continued)

FOREIGN PATENT DOCUMENTS

DE 3634458 A1 4/1988
JP 61-209769 A 9/1986

OTHER PUBLICATIONS

Madsen, Robert J., "Welding Fundamentals", American Technical Publishers, Inc., 1982, p. 41.*
Althouse et al., "Modern Welding", book, 2000, chapter 3, p. 3.*

(Continued)

*Primary Examiner* — Devang R Patel
(74) *Attorney, Agent, or Firm* — Berenato & White, LLC

(57) ABSTRACT

Nickel-base radiant tube includes straight and curved elbow tube sections. The straight tube section has constant inner and outer radii. The elbow tube section has a constant inner radius and variable outer radius. The inner diameter of the elbow tube section is equal the inner radius of the straight tube section. Mating end portion of the elbow tube section has an outer radius equal to the outer radius of the straight tube section. Method for making the radiant tube comprises the steps of positioning a mating end portion of the straight tube section adjacent to and aligned with the mating end portion of the elbow tube section so that end faces of the straight and elbow tube sections face each other to define a circumferentially extending weld groove, and butt welding the mating end portions of the straight and elbow tube sections together at the weld groove.

12 Claims, 9 Drawing Sheets

(56) References Cited

U.S. PATENT DOCUMENTS

| | | |
|---|---|---|
| 3,635,498 A | 1/1972 | Patel |
| 4,182,950 A | 1/1980 | Boros |
| 4,244,606 A | 1/1981 | Abrahamson |
| 4,300,598 A | 11/1981 | Royer et al. |
| 4,813,806 A | 3/1989 | Minami et al. |
| 5,183,989 A | 2/1993 | Sanders et al. |
| 5,358,285 A | 10/1994 | Wilson |
| 5,562,312 A | 10/1996 | Carlin |
| RE37,167 E | 5/2001 | Wilson |
| 6,939,083 B2 | 9/2005 | Tosi et al. |
| 2001/0004153 A1* | 6/2001 | Byrnes .......................... 285/179 |
| 2007/0216159 A1 | 9/2007 | Yoshihara et al. |

OTHER PUBLICATIONS

Gray & J Spence T G F, "Rational Welding Design passage"; Rational Welding Design, Butterworth, London, GB, Jan. 1, 1982; pp. 70-71, XP002366109; Figure 1.44.

* cited by examiner

NICKEL-BASE RADIANT TUBE AND METHOD FOR MAKING THE SAME

CROSS-REFERENCE TO RELATED APPLICATION

This Application claims the benefit under 35 U.S.C. 119(e) of U.S. Provisional Application No. 61/358,639 filed Jun. 25, 2010 by Sree Harsha Lalam et al.

BACKGROUND OF THE INVENTION

1. Field of the Invention

The present invention relates to methods for making radiant tubes in general and, more particularly, to a method for making a nickel-base radiant tube comprising straight and elbow tube sections having different thicknesses.

2. Description of the Related Art

Radiant tubes used to heat industrial furnaces are well known. Usually, in a radiant tube furnace, products of combustion from a burner are confined within a radiant tube with the material to be heated neighboring or surrounding the radiant tube. The heat from the burner is indirectly transferred to the material via the radiant tube, primarily by radiation and secondarily by convection. In a radiant tube furnace, the material being heated is isolated from the products of combustion of the burner, allowing a protective atmosphere to be maintained surrounding the material.

Gas fired radiant tubes have been in use in various heating systems. These tubes vary in shape depending on type of application, burners and fuel being fired. Typically, U-shaped, P-shaped or W-shaped radiant tubes are used, each including two (in case of the U-shaped radiant tubes) or four (in case of the W-shaped radiant tubes) straight tube sections (or legs) and semi-toroidal elbow tube sections connected by a weld joint. Moreover, one of the straight tube sections of the typical radiant tube is a firing leg equipped with a burner, while the other is an exhaust leg or alternative firing being used to uniformly heat the tube. The firing leg of the radiant tube is the hotter leg since the majority of the combustion occurs therein.

The efficiency, fabrication cost and service life of these tubes are very important in decreasing fuel cost, emissions and repair frequency. The burner and operating temperature dictate the alloy design of the system. The burner mixes fuel gas with air/oxygen to generate heat in the firing leg and hot gases traverse through the remaining part of the radiant tube to give a desirable uniform temperature along the whole length of the radiant tube. In reality, achieving uniform temperature throughout the length of the radiant tube is not practical. There are regions with high temperature called hot spots, and at these hot spots the designed temperature may exceed and lead to a premature failure. To avoid such failures in conventional regenerative burners, firing is carried out at both ends of the radiant tube at optimum firing intervals. The change in flow directions is expected to reduce hot spots. Upgrading old burners with a regenerative mechanism is an expensive task; therefore highly alloyed tubes are used as a counter measure.

Nickel-base radiant tubes, including W-shaped radiant tubes, have been in use at a continuous annealing processing line (CAPL) and other furnaces for heat treatment of sheet steels. The CAPL production lines are being used to heat treat sheet steels and to transform microstructure of cold rolled sheet steel to produce DP, TRIP and other advanced high strength steel (AHSS) grades.

In this heating device, or furnace, the mixing of fuel gas and air (20% oxygen) and firing takes place at an entry tube section of the radiant tube, i.e., in the firing leg. As a result the entry tube section (firing leg) and the adjacent elbow tube section attain the highest temperatures during operation. Conventionally, the tube sections of the radiant tube consist of composite materials: a highly alloyed firing leg and a lean alloyed exhaust leg. For example, nickel base super alloy radiant tubes have been used in day to day operation of the CAPL for annealing of sheet steels. These tubes have to withstand high operating temperatures ~1,100° C. and associated thermal stresses during service with the radiant tube. The fabrication of these tubes involves welding of centrifugally cast straight tube sections (legs) with static cast elbow tube sections. The radiant tubes have to withstand service temperatures for a minimum period of four to six years. However, there are occasions of tube failures associated with poor welds. Some of the radiant tubes were found to fail prematurely within one year after installation. At the same time, on average, each W-shaped radiant tube costs $5,000 to $14,000 and companies often spend $750,000 per year to replace failed radiant tubes.

As shown in FIG. 1, a conventional W-shaped radiant tube 2, mounted to a refractory wall 3 of an industrial furnace, includes straight tube sections (or legs) 4a-4d fabricated by centrifugal casting and elbow tube sections 6a-6c fabricated by static casting. The straight tube sections 4a-4d are joined to the elbow tube sections 6a-6c by weld joints 5. It will be appreciated that the straight tube section 4a is an entry tube section of the radiant tube, or a firing leg, while the straight tube section 4d is an exit tube section, or an exhaust leg. As further illustrated in FIGS. 1 and 2, the straight tube sections 4a-4d have the same outer and inner diameters and a thickness t (typically, about 9 mm). Similarly, the elbow tube sections 6a-6c have the same outer and inner diameters and a thickness T in cross-section (typically, about 15 mm). However, there is a variation in thickness between the straight tube sections 4a-4d and the elbow tube sections 6a-6c. More specifically, the elbow tube sections 6a-6c are thicker than the straight tube sections 4a-4d. In other words, the thickness T of the elbow tube sections 6a-6c (typically, T is about 15 mm) is substantially bigger than the thickness t the straight tube sections 4a-4d (typically, t is about 9 mm). Alternatively, the elbow tube sections 6a-6c may be thinner than the straight tube sections 4a-4d.

Typically, the straight tube sections 4a-4d of the radiant tube 2 are made from special nickel-base alloy, such as Ni—Cr-14W, Ni—Cr-1.5W or HK40, while the elbow tube sections 6a-6c thereof are made from similar or other nickel-base alloy. Specifically, in the exemplary embodiment of FIG. 1, the hottest straight tube section (the firing leg) 4a of the radiant tube 2 is made from a special alloy of high nickel content, such as Ni—Cr-14W, the straight tube section 4b subsequent to the firing leg 4a is made from special alloy, such as Ni—Cr-1.5W, while the straight tube sections 4c and 4d subsequent to the straight tube section 4b are both made from an austenitic Fe—Cr—Ni alloy, such as HK40 alloy that has been a standard heat resistant material for over four decades. The special alloy of high nickel content, as understood and used herein, refers to any special alloy having nickel content of more than 35 weight percent nickel (>35% Ni).

Similarly, the hottest elbow tube section 6a of the radiant tube 2 adjacent to the firing leg 14a is made from a special alloy of high nickel (>35% Ni) content, while the subsequent elbow tube sections 6b and 6c of the radiant tube 2 adjacent to the straight tube sections 4b-4d are both made from the HK40 alloy.

Conventionally, the straight tube sections 4 and the elbow tube sections 6 are weld joined using the design shown in FIG. 2. The adjacent ends of the straight tube sections 4 and the elbow tube sections 6 are machined to 'V' groove 7 and welded using Gas Metal Arc Welding (GMAW), Gas Tungsten Arc Welding (GTAW) or Shielded Metal Arc Welding (SMAW) (also known as Manual Metal Arc Welding (MMAW)) process with nickel filler wire/rod. Due to mismatch between the straight tube sections 4 and the elbow tube sections 6, as well as, in a few cases, insufficient root penetration and thermal fatigue loading, the straight tube sections 4 fail prematurely at weld joints 5. Moreover, when the high nickel (>35% Ni) content alloy is used in fabricating the radiant tube 2, the high nickel content and shape of radiant tubes make welding difficult. The radiant tubes 2 in the CAPL furnace were found to fail prematurely at weld joints 5. In some cases the radiant tubes 2 were failing within two years of installation, while the average design life of the radiant tube 2 is 4 to 6 years.

Thus, typical weld joints of radiant tubes are susceptible to improvements that may enhance their strength and decreases cost of production with increased life of the radiant tubes.

SUMMARY OF THE INVENTION

A first aspect of the invention provides a nickel-base radiant tube comprising a straight tube section and a curved elbow tube section, at least one of which is made of high nickel content alloy. The straight tube section has a first center line, an inner radius and an outer radius both substantially constant along an entire length of the straight tube section and a mating end portion having an end face. The elbow tube section has a second center line, an inner radius substantially constant along an entire length of the elbow tube section and an outer radius substantially varying along the length of the elbow tube section. The inner diameter of the elbow tube section is substantially equal the inner radius of the straight tube section. The elbow tube section includes a mating end portion having an end face, an outer radius substantially equal to the outer radius of the straight tube section, a main portion having an outer radius substantially different than the outer radius of the straight tube section, and a sloped transitional portion disposed between the mating end portion and the main portion of the elbow tube section. The mating end portion of the straight tube section is adjacent to and axially aligned with the mating end portion of the elbow tube section so that the end faces of the straight tube section and the elbow tube section face each other to form a circumferentially extending weld groove. The nickel-base radiant tube further comprises a circumferentially extending butt welding joint occupying the weld groove for weldingly connecting the mating end portions of the straight tube section and the elbow tube section together at the weld groove.

According to a second aspect of the invention, a method for making the nickel-base radiant tube is provided that comprises the steps of providing the straight tube section and the curved elbow tube section, forming the end face on each of the mating end portion of the straight tube section and the mating end portion of the elbow tube section, positioning the mating end portion of the straight tube section adjacent to and axially aligned with the mating end portion of the elbow tube section so that the end faces of the straight tube section and the elbow tube section face each other to define a circumferentially extending weld groove, and butt welding the mating end portions of the straight tube section and the elbow tube section together at the weld groove.

The method for making the nickel-base radiant tube according to the second aspect of the present invention has a number of advantages over the existing methods. Specifically, irrespective of the thicknesses of the straight tube section and elbow tube section, the slope of the sloped transition portion of the elbow tube section reduces the stress concentration during the welding operation, during service and reduces weld failures. Moreover, the weld joint, being away from the region of thickness change, will reduce the amount of filler wire needed and reduce cost. Furthermore, the weld joint according to the present invention eliminates welding of tube sections of different thicknesses, as mating end portions of both welded tube sections have substantially the same thickness. Also, the weld joint design according to the present invention provides room for a manual/automatic (GMAW/GTAW/SMAW) welder to maneuver, which provides consistent weld. Moreover, the weld groove according to the present invention ensures full penetration with nickel base filler wire and reduce the effect of misfit during fit up of straight tube section and elbow tube section. The method for making the nickel-base radiant tube according to the present invention does not require machining the internal diameter of the tube sections to be welded to have room for weld metal at root, which saves machining cost.

BRIEF DESCRIPTION OF THE DRAWINGS

Other objects and advantages of the invention will become apparent from a study of the following specification when viewed in light of the accompanying drawings, wherein.

DESCRIPTION OF EXEMPLARY EMBODIMENTS

Figure 1:
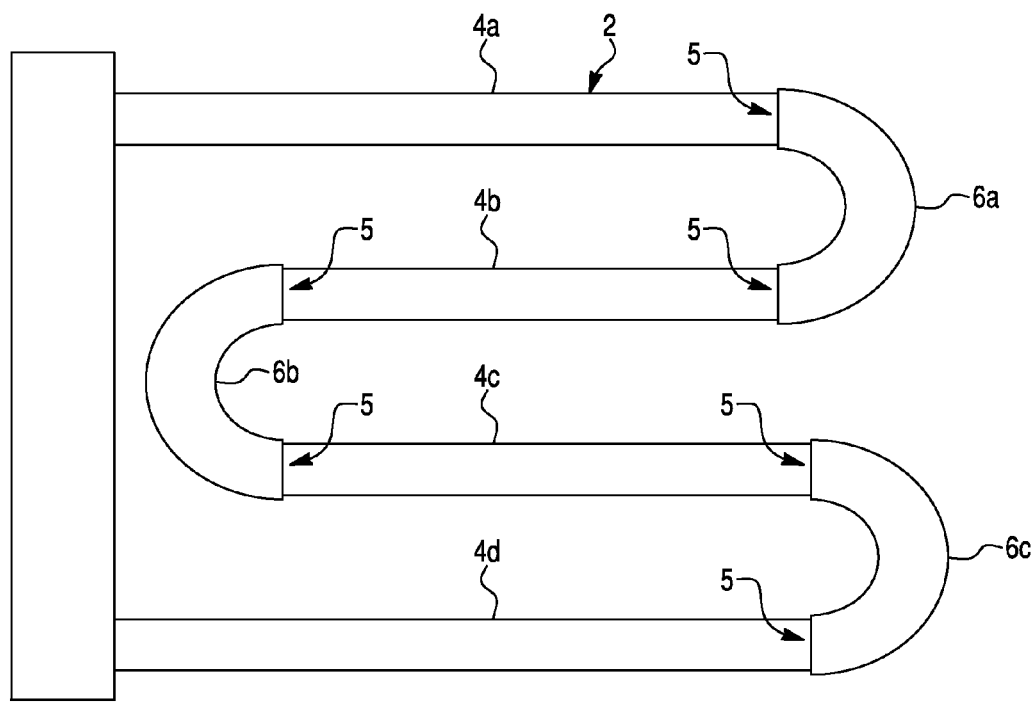
FIG. 1 is a W-shaped radiant tube formed with a conventional weld joint configuration.
Figure 2:
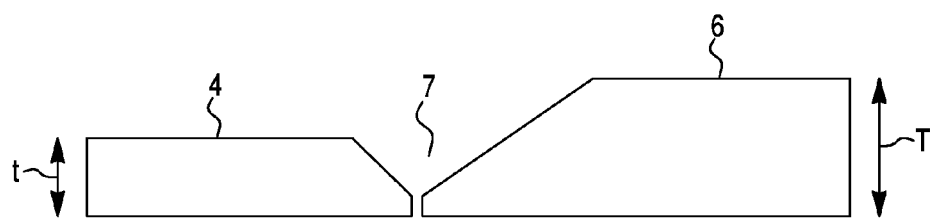
FIG. 2 is a cross-sectional view of conventional weld joint configuration in transverse direction of the radiant tube shown in FIG. 1.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

For purposes of the following description, certain terminology is used in the following description for convenience only and is not limiting. The words "top", "bottom", "right", "left", "lower", "upper", "inner" and "outer" designate directions in the drawings to which reference is made. The words "uppermost" and "lowermost" refer to position in a vertical direction relative to a geometric center of the apparatus of the present invention and designated parts thereof. The terminology includes the words above specifically mentioned, derivatives thereof and words of similar import. Additionally, the word "a" as used in the claims means "at least one".

Figure 3:
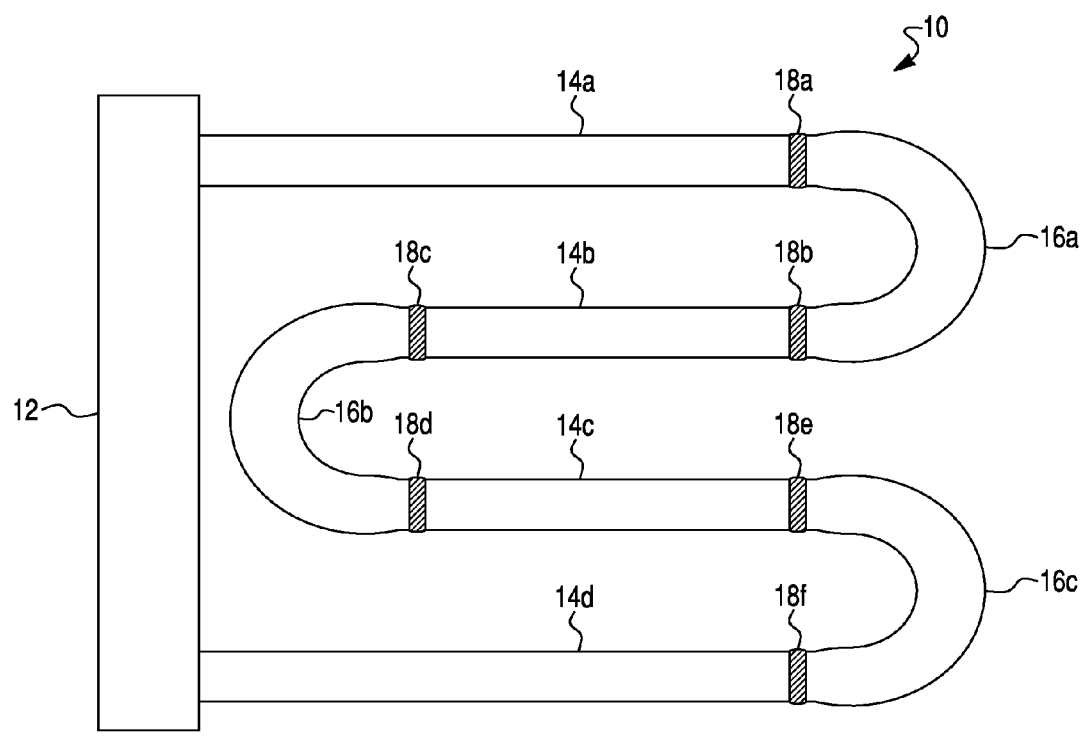
FIG. 3 is a W-shaped radiant tube formed according to a first exemplary embodiment of the present invention.

FIG. 3 schematically depicts a W-shaped radiant tube 10 according to the present invention, mounted to a refractory wall 12 of an industrial furnace. The W-shaped radiant tube 10 includes first (or horizontal) tube sections (or legs) 14a-14d fabricated by any appropriate technique known in the art, such as by centrifugal casting, and second (or elbow) tube sections 16a-16c fabricated by any appropriate technique known in the art, such as by static casting. Preferably, as illustrated in FIG. 3, the first tube sections 14a-14d are in the form of straight, extended tube sections (straight tube sections), while the second (elbow) tube sections 16a-16c are in the form of semi-circularly curved (or semi-toroidal) elbow tube sections (curved tube sections).

As further illustrated in FIG. 3, the straight tube sections 14a-14d are joined to the elbow tube sections 16a-16c by butt-welding joints 18a-18f. It will be appreciated that the straight tube section 14a is an entry tube section of the radiant tube, or a firing leg, while the straight tube section 14d is an exit tube section, or an exhaust leg. The straight tube sections 14b and 14c are intermediate tube sections, or legs. Similarly to the conventional W-shaped radiant tube 2, illustrated in FIG. 1, the straight tube sections 14a-14d of the radiant tube 10 are made from a special alloy, such as Ni—Cr-14W, Ni—Cr-1.5W or HK40, while the elbow tube sections 16a-16c thereof are made from HK40 alloy, which is an austenitic Fe—Cr—Ni alloy. Specifically, in the exemplary embodiment of FIG. 3, the hottest straight tube section (the firing leg) 14a of the radiant tube 10 is made from a special alloy of high nickel content (>35% Ni), such as Ni—Cr-14W, the straight tube section 14b subsequent to the firing leg 14a is made from special alloy, such as Ni—Cr-1.5W, while the straight tube sections 14c and 14d subsequent to the straight tube section 14b are both made from an austenitic Fe—Cr—Ni alloy, such as HK40 alloy that has been a standard heat resistant material for over four decades. Similarly, the hottest elbow tube section 16a of the radiant tube 10 adjacent to the firing leg 14a is made from a special alloy of high nickel (>35% Ni) content, while the subsequent elbow tube sections 16b and 16c of the radiant tube 10 adjacent to the straight tube sections 14b-14d are both made from the HK40 alloy.

The straight tube sections 14a-14d as well as the elbow tube sections 16a-16c of the radiant tube 10 are substantially geometrically (dimensionally) identical to each other in the exemplary embodiment of the present invention, although the straight tube sections 14b and 14c are shorter than the straight tube sections 14a and 14d, as shown in FIG. 3. In view of these similarities, and in the interest of simplicity, the following discussion will use a reference numeral in brackets without a letter to designate an entire group of substantially identical structures. For example, the reference numeral [14] will be used when generically referring to each or all of the straight tube sections 14a-14d rather than reciting the reference numeral with a letter or all four reference numerals. Both or one of the straight tube section [14] and the elbow tube section [16] of the radiant tube 10 is made of high nickel (>35% Ni) content alloy.

For the purpose of this application, the terms "substantially dimensionally identical", "substantially equal", "substantially constant", "substantially the same", etc. mean that variation in geometrical dimensions of the tube sections or the portions thereof is within production tolerance, e.g., less than ±5%. On the other hand, the terms "substantially varies", "substantially different", "substantially larger", "substantially bigger", "substantially smaller", etc. mean that variation in geometrical dimension of the tube sections is outside the production tolerance, e.g., more than ±5%.

Figure 4:
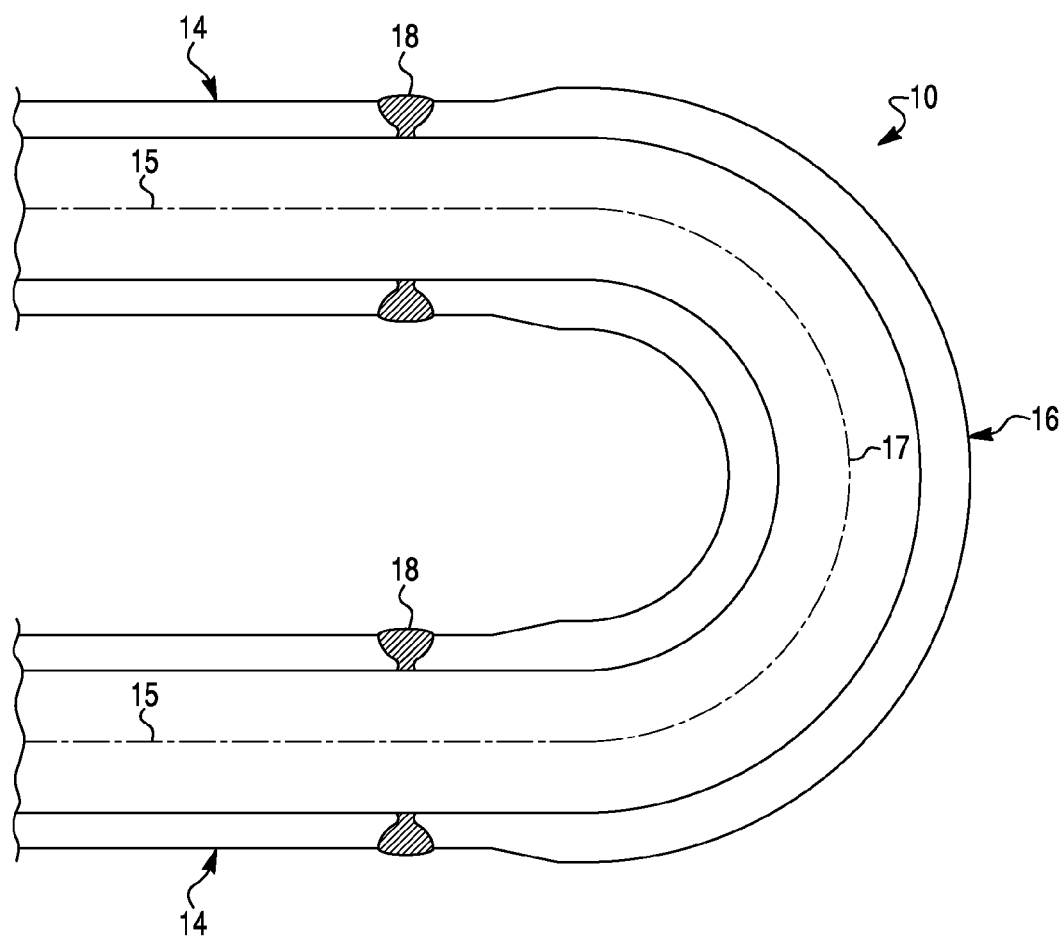
FIG. 4 is a partial side cross-sectional view of the radiant tube according to the first exemplary embodiment of the present invention shown in FIG. 3.
Figure 5:
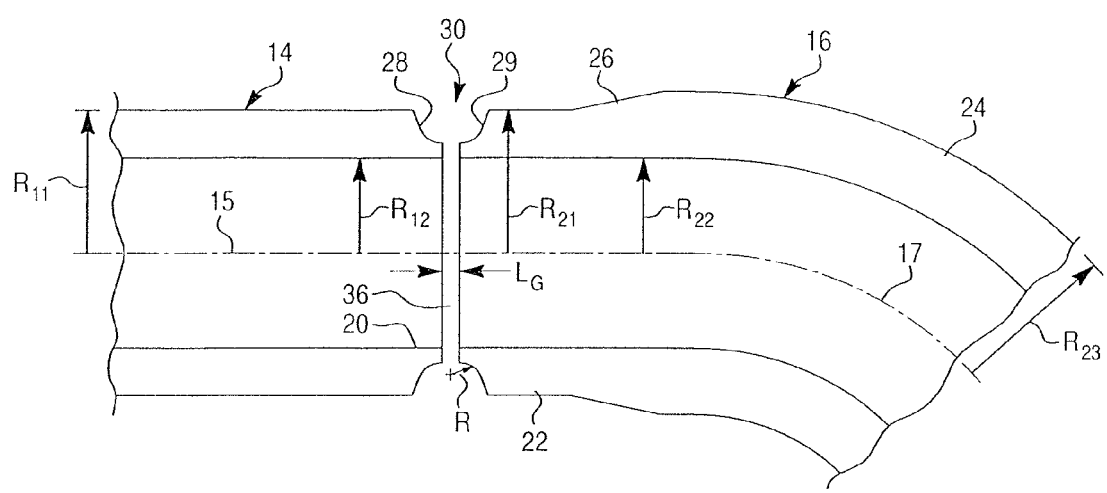
FIG. 5 is an enlarged side cross-sectional view of a partially assembled portion of the radiant tube according to the first exemplary embodiment of the present invention without a weld joint.
Figure 6:
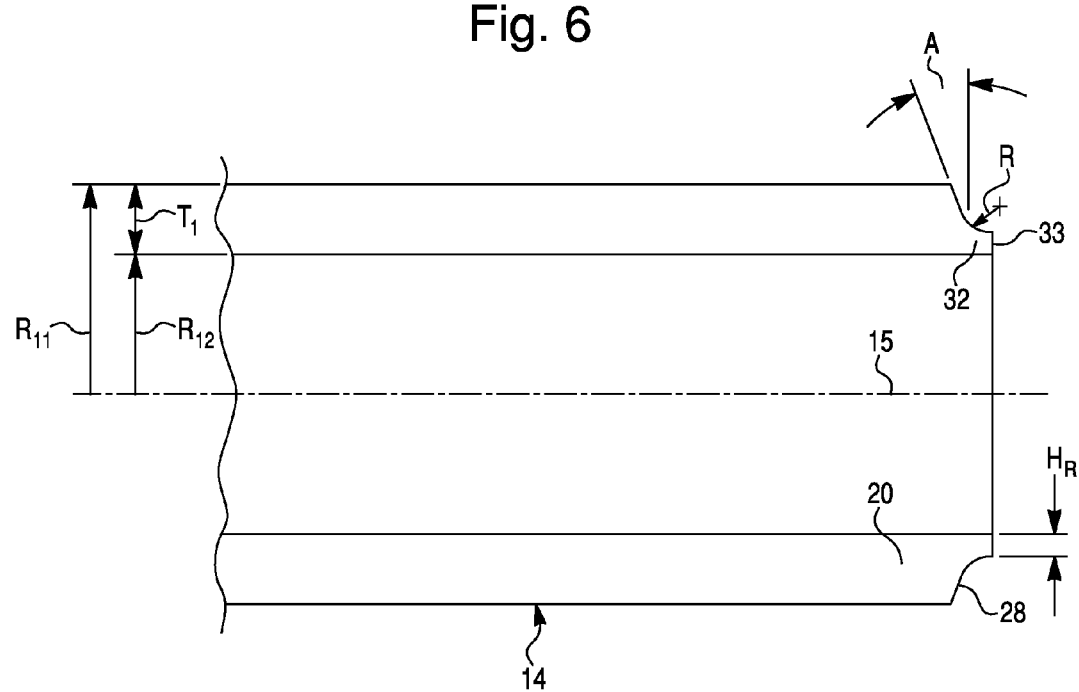
FIG. 6 is a partial enlarged side cross-sectional view of a straight tube section of the radiant tube according to the first exemplary embodiment of the present invention.

As illustrated in FIGS. 3-7, each the straight tube sections [14] have constant outer and inner diameters and constant thicknesses along the entire length thereof. However, the elbow tube sections [16] have the same inner diameter but a variable outer diameter. In other words, each of the elbow tube section [16] according to the present invention has a variable thickness along the length thereof. As best illustrated in FIGS. 4-7, there is a variation in thickness between the straight tube sections [14] and the elbow tube sections [16]. Specifically, the straight tube section [14] has a first, straight center line (central axis) 15, an inner radius $R_{12}$ and an outer radius $R_{11}$ both substantially constant along an entire length of the straight tube section [14], as shown in FIGS. 4-6. Thus, the straight tube section [14], including a mating end portion 20 thereof adjacent to and facing the elbow tube section [16] as shown in FIG. 5, has a constant thickness $T_1=R_{11}-R_{12}$ in cross-section, i.e., in the direction (or plane) perpendicular to the first center line 15, along the entire length of the straight tube section [14] and the first center line 15. Preferably, the thickness $T_1$ of the first tube section [14] is between 6 to 20 mm.

Figure 7:
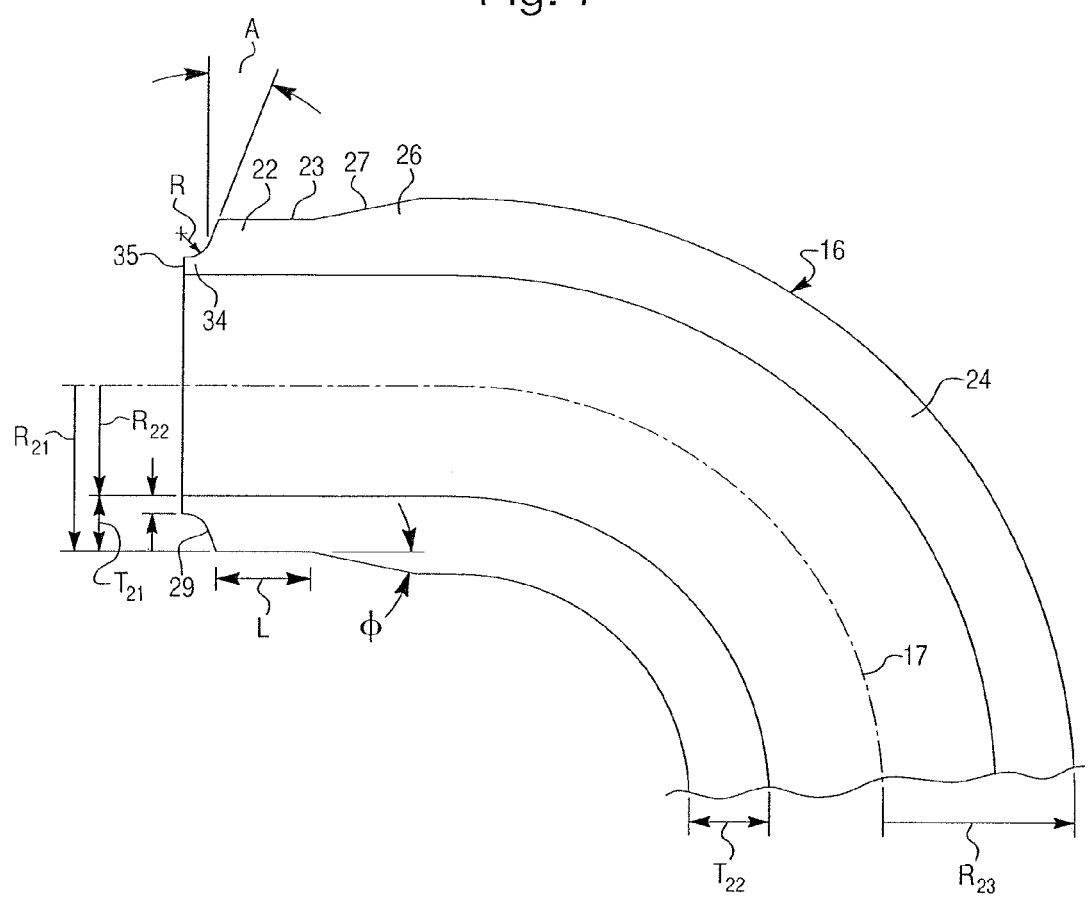
FIG. 7 is a partial enlarged side cross-sectional view of an elbow tube section of the radiant tube according to the first exemplary embodiment of the present invention.

The elbow tube section [16] according to the present invention, on the other hand, as best shown in FIGS. 5 and 7, has a second, generally curved center line (central axis) 17, an inner radius $R_{22}$ substantially constant along an entire length of the elbow tube section [16], and an outer diameter that substantially varies along the length of the elbow tube section [16]. According to the first exemplary embodiment of the present invention as illustrated in detail in FIG. 5, the inner radius $R_{22}$ of the elbow tube section [16] is substantially equal the inner diameter $R_{11}$ of the straight tube section [14]. More specifically, as illustrated in detail in FIGS. 5 and 7, the elbow tube section [16] includes a mating end portion 22 adjacent to and facing the mating end portion 20 of the straight tube section [14], a main portion 24 and a sloped transition portion (thickness transition portion) 26 disposed between the mating end portion 22 and the main portion 24 of the elbow tube section [16].

Further according to the first exemplary embodiment of the present invention illustrated in FIGS. 3-6, the mating end portion 22 of the elbow tube section [16] has an outer diameter $R_{21}$ substantially constant along an entire length of the mating end portion 22 and substantially equal to the outer diameter $R_{11}$ of the straight tube section [14] ($R_{21}=R_{11}$), while the main portion 24 has an outer diameter $R_{23}$ substantially larger than the outer diameter $R_{11}$ of the straight tube section [14] (i.e., $R_{23}>R_{11}$). Consequently, a thickness $T_{21}$ of the mating end portion 22 of the elbow tube section [16] is substantially constant along an entire length of the mating end portion 22 and substantially smaller than a thickness $T_{22}$ of the main portion 24 thereof in cross-section, i.e., in the direction (or plane) perpendicular to the second center line 17 (i.e., $T_{21}<T_{22}$). In other words, the elbow tube section [16] has a variable thickness in cross-section, i.e., in the direction (or plane) perpendicular to the second central axis 17, along the second center line 17 and the length of the elbow tube section [16]. Preferably, in the first exemplary embodiment of the present invention, the thickness $T_{21}$ of the mating end portion 22 of the elbow tube section [16] is between 6 to 20 mm, while the thickness $T_{22}$ of the main portion 24 thereof is between 6 to 25 mm. The mating end portion 22 of the elbow tube section [16] has a substantially cylindrical outer surface 23 coaxial with the first center line 15. The mating end portion 22 of the elbow tube section [16] is further characterized by a length L along the second central axis 17. Preferably, the length L of the mating end portion 22 of the elbow tube section [16] is more than 13 mm (L>13 mm). According to the first exemplary embodiment of the present invention, the outer diameter $R_{23}$ of the main portion 24 of the elbow tube section [16] is substantially constant along an entire length of the main portion 24.

As further illustrated in FIGS. 5 and 7, the sloped transition portion 26 has a frusto-conical outer surface 27 connecting the mating end portion 22 of the elbow tube section [16] with the main portion 24 thereof. Preferably, an angle Ø of the sloped transition portion 26 relative to the cylindrical outer surface 23 and the second center line 17 is ≤22° (Ø≤22°).

The straight and elbow tube sections [14] and [16] could be made by any appropriate technique known in the art, such as by metal casting. Preferably, the straight tube sections [14] are fabricated by centrifugal casting, while the elbow tube sections [16] are fabricated by static casting. The dimensionally more complex elbow tube section [16] can be made first by static metal casting as having a substantially constant thickness along an entire length thereof, then machining an outer peripheral surface of the elbow tube section to form the mating end portion 22, the main portion 24 having the outer diameter substantially different than the outer diameter of the mating end portion 22, and the sloped transition portion 26 disposed between the mating end portion 22 and the main portion 24. Alternatively, the elbow tube section [16] can be made by metal casting so that the final casting has integrally formed the mating end portion 22, the main portion 24 having the outer diameter substantially different than the outer diameter of the mating end portion 22, and the sloped transition portion 26 disposed between the mating end portion 22 and the main portion 24.

Furthermore, to ensure full penetration, a circumferentially extending groove 30 between mating end portions 20, 22 of the straight and elbow tube sections [14], [16], respectively, is formed. According to the first exemplary embodiment of the present invention, as best shown in FIG. 5, the groove 30 is in the form of a U-shaped groove. Consequently, in order to form the U-shaped groove 30, the mating end portion 20 of the straight tube section [14] has a concave, J-shaped annular mating end face 28, while the mating end portion 22 of the elbow tube section [16] has a concave, J-shaped annular mating end face 29 substantially dimensionally identical to the mating end face 28 of the straight tube section [14]. Each of the J-shaped mating end faces 28, 29 includes a circular arc segment 28a, 29a and a straight segment 28b, 29b, respectively. Preferably, a radius R of the circular arc segment 28a of the mating end face 28 (shown in in detail in FIG. 6), is 4 to 8 mm, while an angle A of the straight segment 28b thereof relative to a line perpendicular to the first center line 15 is 13° to 20°. Similarly, a radius R of the circular arc segment 29a of the mating end face 29 (shown in in detail in FIG. 7), is 4 to 8 mm, while an angle A of the straight segment 29b thereof relative to a line perpendicular to the second center line 17 is 13° to 20°.

As further illustrated in FIGS. 5-7, each the mating end portions 20 and 22 of the straight and elbow tube sections [14] and [16] includes an annular root member 32 and 34, respectively, protruding along corresponding one of the first and second center lines 15 and 17. Each of the root members 32 and 34 of the straight and elbow tube sections [14] and [16] defines an annular root face 33 and 35, respectively. Preferably, the annular root face 33 of the straight tube section [14] is perpendicular to the first center line 15, while the annular root face 35 of the elbow tube section [16] is perpendicular to the second center line 17. Preferably, the root members 32 and 34 of the straight and elbow tube sections [14] and [16] are substantially identical dimensionally to each other, and a height $H_R$ of each of the root faces 33 and 35 is between 1 to 3 mm.

Figure 8:
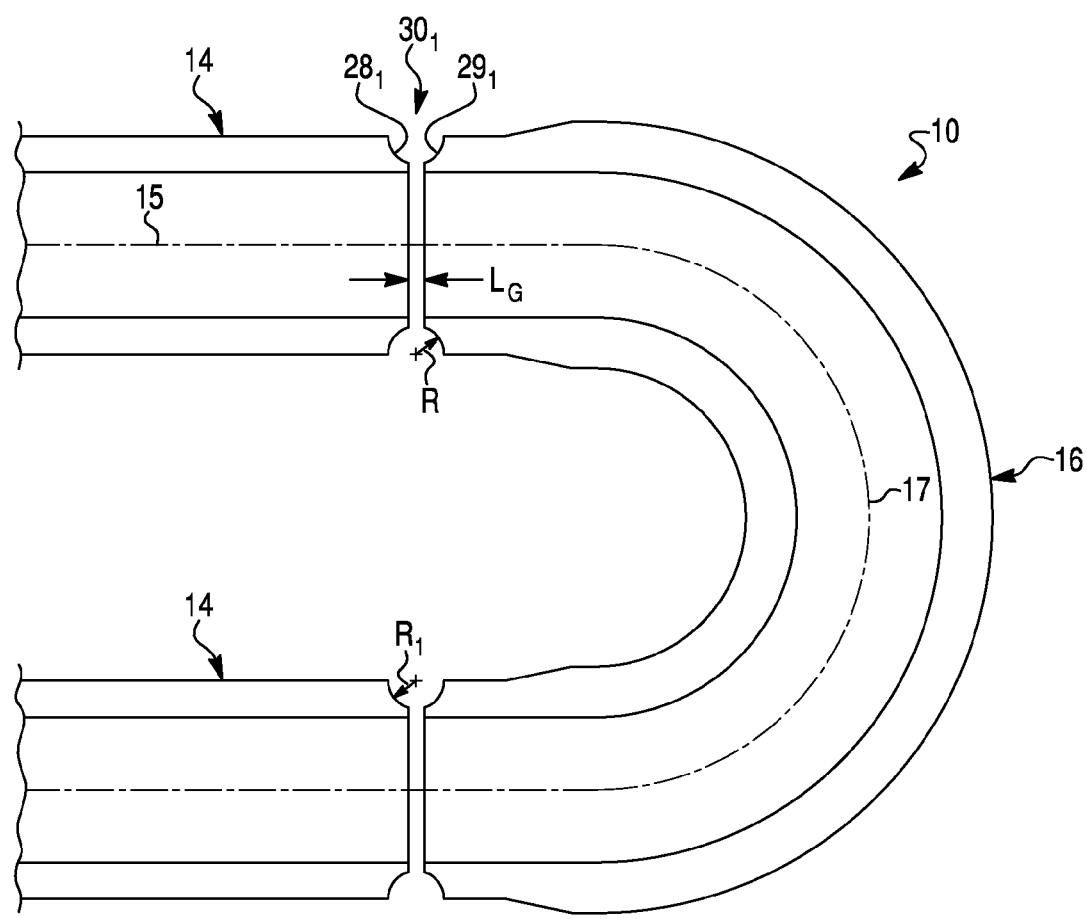
FIG. 8 is an enlarged side cross-sectional view of a partially assembled portion of the radiant tube according to the first exemplary embodiment of the present invention without a weld joint having an alternative embodiment of a weld groove between mating end portions of the straight and elbow tube sections.

Alternatively, as illustrated in FIG. 8, the groove between mating end portions 20, 22 of the straight and elbow tube sections [14], [16] is formed as a semi-circular (in the axial direction along the center line 15) groove $30_1$ defined by mating end faces $28_1$ and $29_1$ of the mating end portions 20, 22 of the straight and elbow tube sections [14], [16] each in the form of a circular arc. Compared to the U-shaped groove 30, the semi-circular groove $30_1$ requires more weld metal to fill, but saves in machining time by using a simple circular or semi-circular tool instead of a J-shaped tool. According to the alternative embodiment of the groove between mating end portions 20, 22 of the straight and elbow tube sections [14], [16], a radius $R_1$ of the groove $30_1$ is T1 minus the height $H_R$ of the root face (33 or 35) (as shown in FIG. 8).

Preferably, the concave annular mating end faces 28, 29 and the annular root member 32, 34 of the straight and elbow tube sections [14] and [16] are formed by machining.

Figure 9:
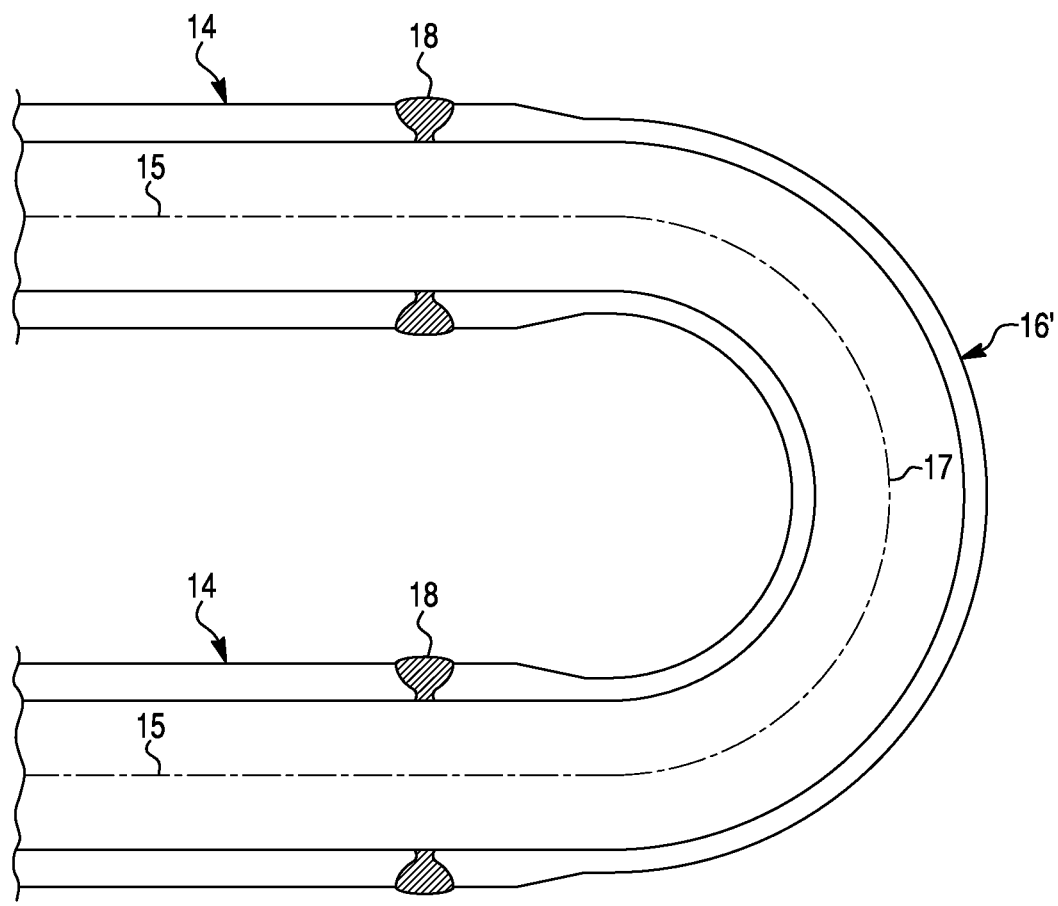
FIG. 9 is a partial side cross-sectional view of the radiant tube according to a second exemplary embodiment of the present invention.
Figure 10:
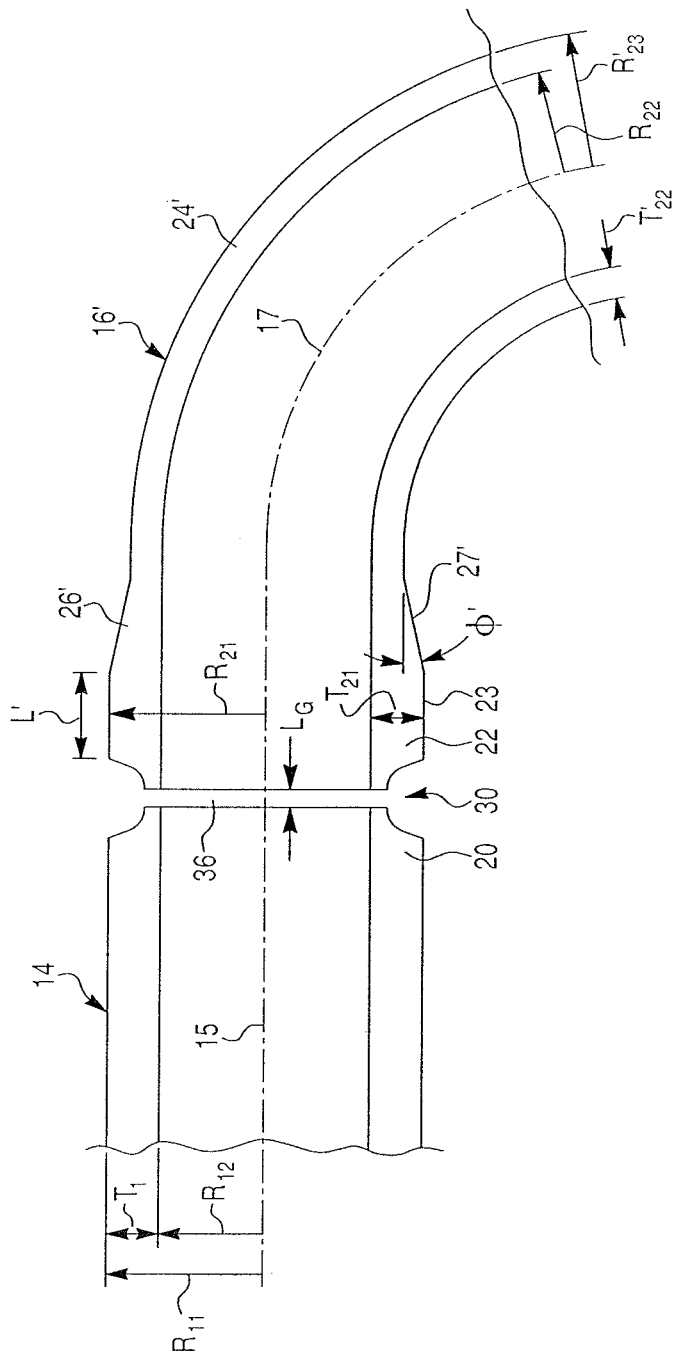
FIG. 10 is an enlarged side cross-sectional view of a partially assembled portion of the radiant tube according to the second exemplary embodiment of the present invention without a weld joint.

Alternatively, according to the second exemplary embodiment of the radiant tube of the present invention illustrated in FIGS. 9 and 10, straight tube sections [14] are substantially identical to the straight tube sections [14] according to the first exemplary embodiment of the present invention, while elbow tube section [16'] differs from the elbow tube section [16] according to the first exemplary embodiment of the present invention. Specifically, the elbow tube section [16] according to the second exemplary embodiment of the present invention, has a second, generally curved center line (central axis) 17, an inner radius $R'_{22}$ substantially constant along an entire length of the elbow tube section [16'], and an outer diameter that substantially varies along the length of the elbow tube section [16']. According to the second exemplary embodiment of the present invention as illustrated in detail in FIG. 10, the inner radius $R_{22}$ of the elbow tube section [16'] is substantially equal the inner diameter $R_{11}$ of the straight tube section [14]. The elbow tube section [16] includes a mating end portion 22 adjacent to and facing the mating end portion 20 of the straight tube section [14], a main portion 24' and a sloped transition portion 26' disposed between the mating end portion 22 and the main portion 24' of the elbow tube section [16']. Further according to the second exemplary embodiment of the present invention illustrated in FIGS. 9-10, the mating end portion 22 of the elbow tube section [16'] has an outer diameter $R_{21}$ substantially equal to the outer diameter $R_{11}$ of the straight tube section [14] ($R_{21}=R_{11}$), while the main portion 24' has an outer diameter R'$_{23}$ substantially smaller than the outer diameter R$_{11}$ of the straight tube section [14] (i.e., R$_{23}$>R$_{11}$). The mating end portion 22 of the elbow tube section [16'] of the second exemplary embodiment of the present invention is substantially identical to the mating end portion 22 of the elbow tube section [16] according to the first exemplary embodiment of the present invention. Consequently, a thickness T$_{21}$ of the mating end portion 22 of the elbow tube section [16'] is substantially constant along an entire length of the mating end portion 22 and substantially greater than a thickness T'$_{22}$ of the main portion 24' thereof in cross-section, i.e., in the direction (or plane) perpendicular to the second center line 17' (i.e., T$_{21}$>T$_{22}$). Preferably, in the first exemplary embodiment of the present invention, the thickness T$_{21}$ of the mating end portion 22 of the elbow tube section [16] is between 15 to 20 mm, while the thickness T'$_{22}$ of the main portion 24' thereof is between 6 to 14 mm. The mating end portion 22 of the elbow tube section [16'] has a substantially cylindrical outer surface 23 coaxial with the first center line 15. The mating end portion 22 of the elbow tube section [16'] is further characterized by a length L' along the second central axis 17. Preferably, the length L' of the mating end portion 22 of the elbow tube section [16'] is more than 13 mm (L'>13 mm). As further illustrated in FIG. 10, the sloped transition portion 26' has a frusto-conical outer surface 27' connecting the mating end portion 22 of the elbow tube section [16'] with the main portion 24' thereof. Preferably, an angle Ø of the sloped transition portion 26' relative to the cylindrical outer surface 23 and the second center line 17 is ≤22° (Ø≤22°). According to the second exemplary embodiment of the present invention, the outer diameter R'$_{23}$ of the main portion 24' of the elbow tube section [16'] is substantially constant along an entire length of the main portion 24'.

A method for making the radiant tube 10 according to the present invention comprises the following steps. It should be understood that the following method applies to both first and second exemplary embodiments of the present invention.

First, the straight tube section [14] and the curved elbow tube section [16] (or [16']) are provided. At least one of the straight tube section [14] and the elbow tube section [16] of the radiant tube 10 is made of high nickel content alloy.

As described above, the straight tube section [14] has the center line 15, the inner radius R$_{12}$ and the outer radius R$_{11}$ both substantially constant along an entire length of the straight tube section. The curved elbow tube section [16] has the center line 17, the inner radius R$_{22}$ substantially constant along an entire length of the elbow tube section [16] and an outer radius substantially varying along the length of the elbow tube section [16]. Moreover, the inner radius R$_{22}$ of the elbow tube section [16] is substantially equal to the inner radius R$_{11}$ of the straight tube section [14]. As further described hereinabove, the elbow tube section [16] includes the mating end portion 22 having the outer radius R$_{21}$ substantially equal to the outer radius R$_{11}$ of the straight tube section, a main portion 24 having the outer radius R$_{23}$ substantially different than the outer radius R$_{11}$ of the straight tube section, and the sloped transition portion 26 disposed between the mating end portion 22 and the main portion 24 of the elbow tube section [16]. Each of the mating end portions 20 and 22 of the straight and elbow tube sections [14] and [16] is formed with the annular concave end face 28 and 29, respectively.

Next, the mating end portion 20 of the straight tube section [14] is positioned adjacent to and axially aligned with the mating end portion 22 of the elbow tube section [16] (or [16']) so that the end faces 28, 29 of the straight tube section [14] and the elbow tube section [16] face each other to form the circumferentially extending weld groove 30. Preferably, the mating end portions 20 and 22 are positioned so as to be axially spaced from each other along the coaxial center lines 15 and 17. In other words, the mating end portions 20 and 22 of the straight and elbow tube sections [14] and [16] are positioned relative to each other so that the root face 33 of the mating end portion 20 of the straight tube section [14] is spaced a predetermined distance L$_G$ from the root face 35 of the mating end portion 24 of the elbow tube section [16] along the corresponding first and second center lines 15 and 17. Thus, a root gap 36 is provided between the root faces 33 and 35 of the corresponding straight and elbow tube sections [14] and [16], as best illustrated in FIG. 5. Preferably, the predetermined distance L$_G$ of the root gap 36 between the root faces 33 and 35 when the straight and elbow tube sections [14] and [16] are positioned for welding is between 1 to 3 mm.

Finally, the mating end portions 20 and 22 of the straight and elbow tube sections [14] and [16] are butt welded together at the weld groove by any appropriate manner known in the art to form the butt-welding joint [18] using a nickel-base filler wire.

The method for forming the radiant tube by welding the straight tube section [14] to the elbow tube section [16] (or [16']), according to the present invention, does not need or require machining the internal diameter of the tube sections [14] and [16] to have room for weld metal at root, which saves machining cost.

Therefore, the present invention provides a novel method for forming a radiant tube by welding. The method according to the present invention does not require machining the internal diameter to have room for weld metal at root, which saves machining cost.

The method for making the nickel-base radiant tube according to the present invention has the following advantages:

Irrespective of the straight tube section and elbow tube section thicknesses, the proposed slope of the sloped transition portion of the elbow tube section reduces the stress concentration during the welding operation, service;

The weld joint, being away from the region of thickness change, will reduce the amount of filler wire needed and reduce cost;

The weld joint according to the present invention eliminates welding of tube sections of different thicknesses, as mating end portions of both welded tube sections have substantially the same thickness;

The weld joint design according to the present invention provides a room for a manual/automatic (GMAW/GTAW/SMAW) welder to maneuver, which provides consistent weld; and Weld groove according to the present invention ensures full penetration with nickel base filler wire and reduce the effect of misfit during fit up of straight tube section and elbow tube section.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for making a nickel-base radiant tube including a straight tube section and a curved elbow tube section, said method comprising the steps of:
   a) providing said straight tube section having a first center line, an inner radius and an outer radius both substantially constant along an entire length of said straight tube section;
   b) providing said curved elbow tube section having a second center line, an inner radius substantially constant along an entire length of said elbow tube section and an outer radius varying along a portion of the length of said elbow tube section;
   said inner radius of said elbow tube section being substantially equal said inner radius of said straight tube section;
   said elbow tube section including a mating end portion having an outer radius substantially equal to said outer radius of said straight tube section, a main portion having an outer radius substantially different than said outer radius of said straight tube section, and a sloped transitional portion disposed between said mating end portion and said main portion of said elbow tube section;
   said outer radius of said mating end portion being substantially constant along an entire length of said mating end portion;
   c) forming an end face on each of a mating end portion of said straight tube section and said mating end portion of said elbow tube section;
   d) positioning said mating end portion of said straight tube section adjacent to and axially aligned with said mating end portion of said elbow tube section so that said end faces of said straight tube section and said elbow tube section facing each other to define a circumferentially extending weld groove; and
   e) butt welding said mating end portions of said straight tube section and said elbow tube section together at said weld groove.

2. The method according to claim 1, wherein said end face on each of said mating end portion of said straight tube section and said mating end portion of said elbow tube section is in the form of an annular concave end face.

3. The method according to claim 2, wherein said weld groove is formed as one of a U-shaped groove and a semicircular groove.

4. The method according to claim 2, wherein each said mating end portions of said straight and elbow tube sections includes an annular root member protruding along corresponding one of said first and second center lines.

5. The method according to claim 4, wherein each of said root members of said straight and elbow tube sections has an annular root face.

6. The method according to claim 5, wherein said annular root face is substantially perpendicular to corresponding one of said first and second center lines.

7. The method according to claim 5, wherein said step (d) includes the step of positioning said mating end portions of said straight and elbow tube sections relative to each other so that said root face of said mating end portion of said straight tube section is spaced a predetermined distance from said root face of said mating end portion of said elbow tube section along said first center line.

8. The method according to claim 1, wherein said end face on said mating end portion of said straight tube section is substantially geometrically identical to said end face of said mating end portion of said elbow tube section.

9. The method according to claim 1, wherein said outer radius of said main portion of said elbow tube section is substantially bigger than said outer radius of said straight tube section.

10. The method according to claim 1, wherein said outer radius of said main portion of said elbow tube section is substantially smaller than said outer radius of said straight tube section.

11. The method according to claim 1, wherein at least one of said straight tube section and said elbow tube section of said radiant tube is made of high nickel content alloy containing more than 35% of nickel.

12. The method according to claim 1, wherein said outer diameter of said main portion of said elbow tube section is substantially constant along an entire length of said main portion.

* * * * *